United States Patent Office 3,801,560
Patented Apr. 2, 1974

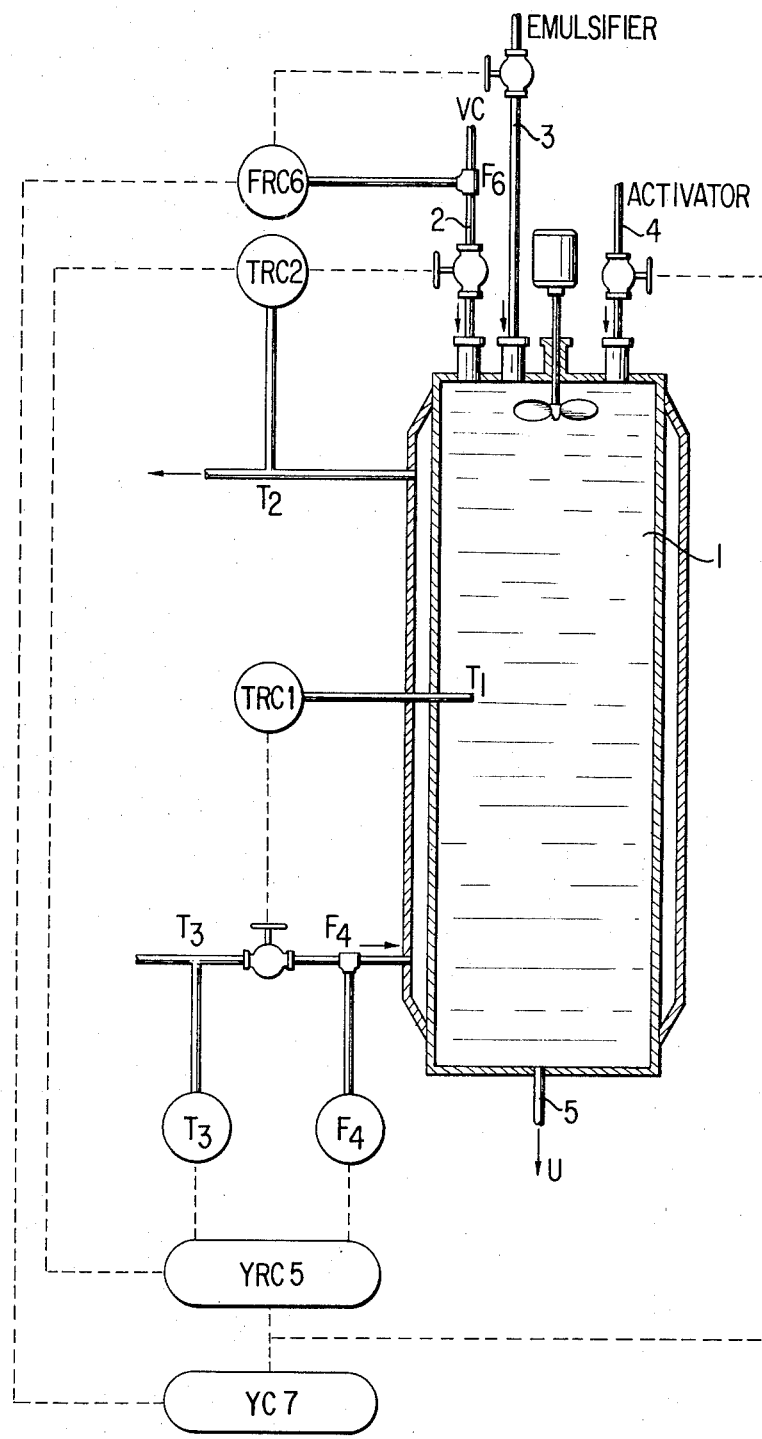

3,801,560
CONTINUOUS EMULSION POLYMERIZATION OF COPOLYMERIZATION OF VINYL CHLORIDE WITHOUT HEAVY METAL SALTS
Harry Roll, Jorg Wergau, and Walter Dockhorn, Marl, Germany, assignors to Chemische Werke Huls Aktiengesellschaft, Marl, Germany
No Drawing. Filed Feb. 1, 1973, Ser. No. 328,621
Claims priority, application Germany, Feb. 23, 1972,
P 22 08 442.0
Int. Cl. C08f 1/13, 1/62
U.S. Cl. 260—92.8 W          2 Claims

ABSTRACT OF THE DISCLOSURE

Improvements in the continuous catalytic emulsion polymerization or copolymerization of vinyl chloride in the presence of anionic emulsifiers and using redox systems as catalysts comprising carrying out the polymerization in the absence of heavy metal salts and in the presence of about 0.020 to 0.0025 percent by weight hydrogen peroxide and about 0.008 to 0.001 percent by weight of ascorbic acid based upon the weight of monomers or comonomers, a weight ratio of said hydrogen peroxide to ascorbic acid of about 4:1 to 2:1, at a pH value of about 7.0 to 5.0 and at a temperature of about 30–70° C.

CROSS REFERENCE TO A RELATED APPLICATION

Applicants claim priority under 35 U.S.C. 119 for application P 22 08 442.0, filed Feb. 23, 1972 in the Patent Office of the Federal Republic of Germany.

BACKGROUND OF THE INVENTION

The field of the invention is synthetic resins from polycarboxylic acid reaction products.

It is an object of the present invention to produce homo- or copolymers of vinylchloride by continuous emulsion polymerization at temperatures of between 30 to 70° C. and a pH value of less than 7 in contrast to the usual anionic emulsifiers and a redox catalyst system of hydrogen peroxide and ascorbic acid.

The redox catalyst system for emulsion polymerization of vinylchloride is known. See Kainer, "Polyvinylchloride and Vinylchloride—mixed polymers," Springer-Verlag, Berlin, Heidelberg, New York, 1965, page 46, line 3 from the bottom to page 50, end of the chapter.

The state of the art of producing vinyl chloride polymers by polymerization in the presence of a redox catalyst may be ascertained by reference to U.S. Pats. 3,509,109 and 3,560,454 of Buning et al. which issued Apr. 28, 1970 and Feb. 2, 1971 respectively, and correspond to German Published Applications 1,595,519 and 1,720,524. The further state of the art may be ascertained by reference to German Published Application 1,164,665 of Scholz et al., filed Apr. 7, 1960 and French Pat. 923,712.

One of the most often used redox systems consists of the components potassium persulfate/Rongalite, where Rongalite is NaHSO₂·CH₂O·2H₂O. It reacts in the same manner as other known redox catalysts. However, it is more advantageously employed in continuous methods.

With the continuous process, in which there is an increasing demand to constantly provide a uniform quality, a special problem arises with respect to the constant maintenance of a given reaction speed and conversion which requires a certain temperature for the K value.

In practice, in order to quickly correct unavoidable variations due to modern demands in reaction speed, the potassium persulfate/Rongalite system is too slow. This is illustrated in comparative Example 2 which follows.

Because of this, a relatively large proportion of catalyst is necessary and this results in noticeably troublesome amounts of catalyst in the end product.

These disadvantages of the prior art are resolved by the present invention.

It was known from French Pat. 923,712 to add heavy metal salts in the hydrogen peroxide-ascorbic acid redox system for emulsion polymerization of ethylenic unsaturated compounds such as vinyl chloride. It is apparent from the disclosure of the French patent that a high weight excess of ascorbic acid with respect to hydrogen peroxide is necessary, e.g., in the production of polyvinylacetate, the ratio is 13:1. There is, however, no suggestion that the addition of heavy metal salts can be eliminated.

In accordance with the latest advances in the art as indicated by the patent literature of the systems offered, the hydrogen peroxide-ascorbic acid redox catalyst system is selected for the discontinuous emulsion polymerization of vinyl chloride. The addition of iron salts is considered necessary in this method. See Example 4, also 1.c, page 3, penultimate line and last line of German Published Application 1,595,519 (corresponding to U.S. Pat. 3,509,109). One uses a comparatively high catalyst content (0.7 to 0.1 weight percent hydrogen peroxide with respect to vinyl chloride) of about 3 times the weight of ascorbic acid compared to hydrogen peroxide.

It was known from the prior art that in order to achieve a high polymerization speed it was necessary to add a certain amount of heavy metal salt to the hydrogen peroxide-ascorbic acid redox system having several times over the excess of ascorbic acid compared to hydrogen peroxide for the vinyl chloride polymerization. See in addition page 4, lines 4 and following, of German Published Application 1,720,524 (corresponding to U.S. Pat. 3,560,454).

SUMMARY OF THE INVENTION

Having in mind the limitations of the prior art, it was surprisingly discovered that no polymerization occurred when the use of the catalyst system in the prior art was transposed. This new and unexpected result can be seen from comparative Example 1a which follows.

Continuous emulsion polymerization already at a standstill appeared to be even more stationary in view of the negative result of substituting the catalyst employed in the German Published Application 1,720,524 (corresponding to U.S. Pat. 3,560,454) for those of the prior art. This can be seen from the results of comparative Example 1b which follows.

It was an extraordinary discovery of the present invention that a high polymerization rate could be achieved by continuous emulsion polymerization of homo- or copolymers of vinyl chloride at temperatures of 30 to 70° C. in the presence of anionic emulsifiers by the use of the redox hydrogen peroxide-ascorbic acid system when the following conditions are met:

0.020 to 0.0025 percent by weight, preferably 0.01 to 0.0025 percent by weight hydrogen peroxide, and 0.008 to 0.001 percent by weight, preferably 0.004 to 0.001 percent by weight ascorbic acid calculated with respect to the weight of the monomer in which the hydrogen peroxide to ascorbic acid weight ratio is 4:1 to 2:1, a pH value of between 7.0–5.0, preferably between 6.7–5.5 and in the absence of heavy metal salts.

The ratio of 0.010 to 0.002 percent by weight hydrogen peroxide and 0.004 to 0.001 percent by weight ascorbic acid with respect to the monomer (or monomers) is preferred in the polymerization reaction in which the weight ratio of hydrogen peroxide to ascorbic acid is 3:1 to 2:1.

BRIEF DESCRIPTION OF THE DRAWING

The drawing attached herewith is a flow sheet illustrating the control of the reaction. The polymerization reactor 1 has an inner temperature $T_1$. The monomer VC is introduced into the reactor through conduit 2 while emulsifier is introduced through conduit 3 and activator is introduced through conduit 4. The product U exits through conduit 5. Control TRC1 controls the cooling mantel of the autoclave by flowing cooling means $F_4$ with the help of a control valve which controls the inner temperature $T_1$. Control TRC2 controls the amount of the monomer VC being introduced by the temperature $T_2$ of the return cooling water. The temperature $T_2$ is controlled by analytical information processor YRC5 whereby control is provided for the temperature $T_3$ of the cooling water feed as well as the amount of circulating water $F_4$. The analytical information processor control element YC7 is set to control the amount of monomer feed $F_6$, the specific heat of polymerization and the end product U. The regulator control FRC6 is employed to maintain a predetermined ratio of emulsifier supply to the measured VC monomer amount $F_6$.

DESCRIPTION OF THE PREFERRED EMBODIMENTS

According to Example 2 of German Published Application 1,164,665, the polymerization of vinyl chloride in the presence of hydrogen peroxide and ascorbic acid and in the absence of heavy metal salts is disclosed. The weight ratio of hydrogen peroxide to ascorbic acid is 50 to 1. This ratio is extreme and is opposite from the ratio employed in the present invention. The polymerization requires 25 hours at 40° C. This disclosure fails to suggest the use of a hydrogen peroxide-ascorbic acid redox system having hydrogen peroxide in excess and the elimination of the heavy metal salts when high polymerization speed is desired.

According to the method of the present invention, moderate polymerization speed is achieved in less than 15 minutes with a yield of 91 to 92 percent by weight. There is no excess activator in the product and a peroxide concentration is employed of more than a magnitude less than that employed in the art for discontinuous methods. The use of expensive ascorbic acid is more than one-half less than that required in the discontinuous methods. These savings are very important in industrial scale mass production. Furthermore, addition of heavy metal salts is completely eliminated. This results not only in a saving of the catalyst component, but also in improved stability of the end product. Reference is made to page 203, lines 16–18 of Ullmann (1963), vol. 14, where the absence of heavy metal in the end product is expressly suggested for improved stability.

Ordinary alkylsulfonates, alkylarylsulfonates and alkylsulfate, excepting fatty acids, are suitable in the emulsion polymerization which compounds require a pH range of between 5–7 in order to exhibit their surface active qualities. The compounds are added in the usual proportions of 4 to 1.5 percent by weight, preferably between 2.5 to 1.7 percent by weight with respect to the monomer or monomers. The pH value of the polymerization mixture is held between 5 and 7, and preferably between 6.7 and 5.0. The pH is maintained within these limits by adding the required amounts of inorganic acids such as phosphoric acid or sulphuric acid to the alkaline solution of emulsifiers. In the case where the pH value sinks during the reaction due to the hydrogen chloride byproduct of the polymerization reaction, the use of a buffer is suggested. The method of the present invention of continuous emulsion polymerization of vinyl chloride can be carried out in any suitable apparatus such as that disclosed by Kainer, ibid, pages 50 and 51 or 52 to 55.

Cooling is carried out by the use of a cooling jacket. The reactor has the usual stirring mechanism and is turned at the usual speed of 50 to 90 r.p.m. The desired K value as disclosed in U.S. Pat. 3,627,719 will be advantageously achieved with a reaction product of between 90 and 94 percent yield under the conditions noted. The operating pressure for such a high reaction ratio is lower than the saturation pressure of the monomer or monomers at the corresponding polymerization temperature.

The temperatures are within the usual temperatures employed for vinyl chloride polymerization, particularly between 30 and 70° C.

The replenishing of the various components of the reaction is continuous. The monomer is introduced in the fluid state. Separate introduction is made of the water solutions of each of the emulsifier, hydrogen peroxide and ascorbic acid.

Vinylidene chloride, vinylacetate, acrylic acid, methacrylic acid, maleic acid, fumaric acid and other vinyl chloride forming monomers may be employed as copolymers.

The method of the present invention permits a saving of catalyst and in addition the production of a degradation catalyst-free end product. The end product is also free of heavy metal salts which cause thermal instability.

Furthermore, it is possible to automatically control the reaction conditions according to the method of the invention.

The fast acting ascorbic acid-hydrogen peroxide activator system permits automatic reaction control because in its presence the reaction speed falls within an order of magnitude of the response time of conventionally employed measuring and regulating systems.

The regulation is possible because for a constant reaction temperature $T_1$ to produce a required product U, an introduced amount of monomer must release a given amount of heat $Y_7$.

The quantity of heat is computed as follows:

$$Q_{vc} \cdot U \cdot C_p = Y \qquad (1)$$

wherein:

$Q_{vc}$ is the monomer introduced in kilograms
U is the product
$C_p$ is the specific polymerization heat in Kcal./kg.
Y is the heat released in the reaction in Kcalories.

Consideration of the continuous polymerization for an instantaneous time gives rise to the following formula:

$$F_6 \cdot U \cdot C_p = Y_7 \qquad (2)$$

wherein:

$F_6$ is the amount of monomer per unit of time given as kg./h. (kilograms/hour)
$Y_7$ is the heat released per unit of time given in Kcalories/h. (kilocalories/hour)

The heat produced by the reaction is computed as follows:

$$(T_2 - T_3) \cdot F_4 \cdot C_k = Y_5 \qquad (3)$$

wherein:

$T_2$ is the temperature of the return cooling medium in ° C.
$T_3$ is the temperature of the input of the cooling medium in ° C.
$F_4$ is the amount of cooling medium per unit of time as kg./h.
$Y_5$ heat output per unit of time as Kcalories/h.
$C_k$ is the specific heat of the cooling medium in Kcalories/kg. degrees By substituting Equation 2 into Equation 3, it is apparent that at a stationary point in time the required product and the heat of reaction is:

$$F_6 \cdot U \cdot C_p = (T_2 - T_3) \cdot F_4 \cdot C_k \qquad (4)$$

Solving this equation for U, we find that the ratio of heat quantity provides a standard for influencing the reaction.

$$U = \frac{(T_2 - T_3) \cdot F_4 \cdot C_k}{F_6 \cdot C_p} \qquad (5)$$

The drawing further illustrates the control of the reaction. The illustrated control TRC1 controls the cooling mantel of the autoclave by flowing cooling means $F_4$ with the help of a control valve which controls the inner temperature $T_1$.

The illustrated control TRC2 controls the amount of the monomer VC being introduced by the temperature $T_2$ of the return cooling water and keeps the desired temperature value constant.

The actual temperature $T_2$ of the return cooling water is controlled by analytical information processor YRC5 whereby control is provided for the temperature $T_3$ of the cooling water feed as well as the value of the amount of running water $F_4$. YR5 is set by the specific heat of the cooling medium CK which is in this case that of water. From these 4 values, YRC5 calculates with respect to the heat given up to the cooling water from the polymerization kettle $T_1$ in a moment according to the following Equation 3:

$$F_4 \cdot C_k \cdot (T_2 - T_3)$$

The analytical information processor control element YC7 is set to control the value of the amount of monomer feed $F_6$, the specific polymerization heat $C_p$, and the required end product U.

Analytical information processor element YC7 computes the product of $F_6 \cdot C_p \cdot U$.

The results of both of these computations, by means of a switching element, are compared with respect to each other. Should these be the same then the ratio=1 and the autoclave is in calorimetric equilibrium and the required amount of product is obtained.

Should the relationship not be equal, i.e., $$F_6 \cdot C_p \cdot U \neq (T_2 - T_3) \cdot F_4 \cdot C_k$$

the ratio regulator, which is positioned between the analytical information processor and an activator control valve, opens so long as necessary in the direction which reestablishes an equilibrium and the concomitant required product.

The regulartor control FRC6 may also be employed to maintain a predetermined ratio of emulsifier supply to the measured VC amount $F_6$.

The following examples and comparative examples will further explain the invention and associated advance in the art.

EXAMPLES

Example 1

To an autoclave, fitted with a cooling mantel and stirring mechanism of 13 m.$^3$ (cubic meters) volume capacity, is fed 776 kg. vinyl chloride, 690 liters of a water solution of 2 percent by weight of an alkansulfonate (Emulsifier K30 of Farbenfabriken Bayer, having an alkyl chain containing 10–18 carbon atoms averaging 15 carbon atoms and disclosed in U.S. Pat. 3,627,717) and 2 kg. of phosphoric acid, 24 liters of 0.25 percent by weight peroxide water solution (0.008 percent by weight with respect to VC), 24 liters of a 0.1 percent by weight water solution of ascorbic acid solution (0.003) percent by weight with respect to VC) with all of the constituents together filling the autoclave to substantially 90 percent as usual. The polymerization temperature is held at 50° C. The end product consists of approximately 91 percent by weight. The product is a stable dispersion with a solid content of about 50 percent which product will be further processed. The K value (as disclosed in U.S. Pat. 3,627,717) of the polymer is 70.

Example 2

724 kg. of vinyl chloride is introduced per hour in the same manner as Example 1 and in addition 38 kg. of vinylacetate were added per hour. The weight ratio of vinyl chloride:vinylacetate is 95:5 respectively. The product was 90 percent by weight and had a K value of 70.

Example 3

This example is the same as Example 1 except that the temperature in the autoclave was about 32° C. The monomers constitute 24 kg. vinyl chloride and 76 kg. vinylidine chloride were added per hour. The weight ratio of vinyl chloride:vinylidine chloride were 24:76, respectively. The product was 97 percent by weight and had a K value of 48.

Comparative Example 1a

The autoclave of 13 m.$^3$ capacity as described in Example 1 was filled as usual to about 90 percent of the capacity of the autoclave as above described. $H_2O_2$, ascorbic acid and iron sulfate was added as a catalyst as disclosed in U.S. Pat. 3,560,454. Each hour the following was added: 700 kg. vinyl chloride, 580 liters of 2 percent water solution of $C_{14}/C_{16}$ alkanesulfonate, 140 liters of a 10 percent ascorbic acid solution, 49 liters of 10 percent hydrogen peroxide solution and 2.8 liters of a 5 percent iron-II sulfate.

Although it was not expected, the reaction could not be made to function. The experiment was repeated several times with the same negative results.

Comparative Example 1b

The catalyst employed in Comparative Example 1a was substituted for that employed in Example 1 of the continuous polymerization equilibrium reaction. The polymerization reaction came to a stand still.

Comparative Example 2

To a 13 m.$^3$ autoclave fitted with a stirring mechanism was hourly added the following: 800 liters vinyl chloride, 690 liters of a water solution consisting of 2 percent by weight of an alkylsulfonate (Comparative Example 1) and 0.1 percent by weight of a buffer system consisting of primary and secondary sodium phosphate in a ratio 2:1, 27 liters of a 3 percent by weight potassium persulfate and 18 liters of a 0.45 percent Rongalite solution. The polymerization temperature is 50° C. and the heat of the reaction is removed by a mantel cooler. The product yield was 90–91 percent. A level control device in the autoclave in synchronization with the input removes the product as a dispersion as it is formed. The non-reacted monomers are removed from the dispersion in an expansion chamber. The dispersion is thereafter further processed.

One should attempt to maintain a stationary reaction condition in the autoclave. In practice, however, due to unavoidable variations in the qualities of the reactants, more particularly the monomers, a fluctuation in the reaction speed is inherent with the accompanying variation in product yield. In order to minimize this continuous variation, the amount of added activator is continuously varied. Delay is nevertheless necessitated since the potassium-Rongalite activator employed does not respond very rapidly. One cannot completely avoid fluctuation in product quality in spite of the close control.

In addition, a relatively long time span is required because of clean up time, the time necessary to reestablish the stationary condition and equilibrium necessary to obtain a required yield of a product. This "startup" time can be as much as 20 percent of the total run and results in substantially less product produced in a given period of time.

What is claimed is:
1. In the continuous catalytic emulsion polymerization or copolymerization of vinyl chloride monomer or co- monomer in the presence of anionic emulsifiers and using redox systems as catalysts, the improvement comprising carrying out the polymerization in the absence of heavy metal salts and in the presence of a redox system comprising about 0.020 to 0.0025 percent by weight hydrogen peroxide and about 0.008 to 0.001 percent by weight of ascorbic acid based upon the weight of said monomer or comonomers, a weight ratio of said hydrogen peroxide to ascorbic acid of about 4:1 to 2:1, at a pH value of about 7.0 to 5.0 and at a temperature of about 30–70° C.

2. The process of claim 1, wherein said ascorbic acid concentration is about 0.004 to 0.001 percent by weight, said hydrogen peroxide is about 0.01 to 0.0025 percent by weight, said ratio of hydrogen peroxide to ascorbic acid is about 3:1 to 2:1, and said pH is about 6.7 to 5.5.

References Cited

UNITED STATES PATENTS

| | | | |
|---|---|---|---|
| 3,317,495 | 5/1967 | Jones | 260—86.3 |
| 3,370,028 | 2/1968 | DeWald | 260—23 |
| 3,509,109 | 4/1970 | Buning et al. | 260—78.5 |
| 3,560,454 | 2/1971 | Buning et al. | 260—78.4 |
| 3,523,109 | 4/1970 | Diessel et al. | 260—87.1 |

JOSEPH L. SCHOFER, Primary Examiner

J. KIGHT, Assistant Examiner

U.S. Cl. X.R.

260—78.5 R, Cl, 86.3, 87.1, 87.7